2,768,527

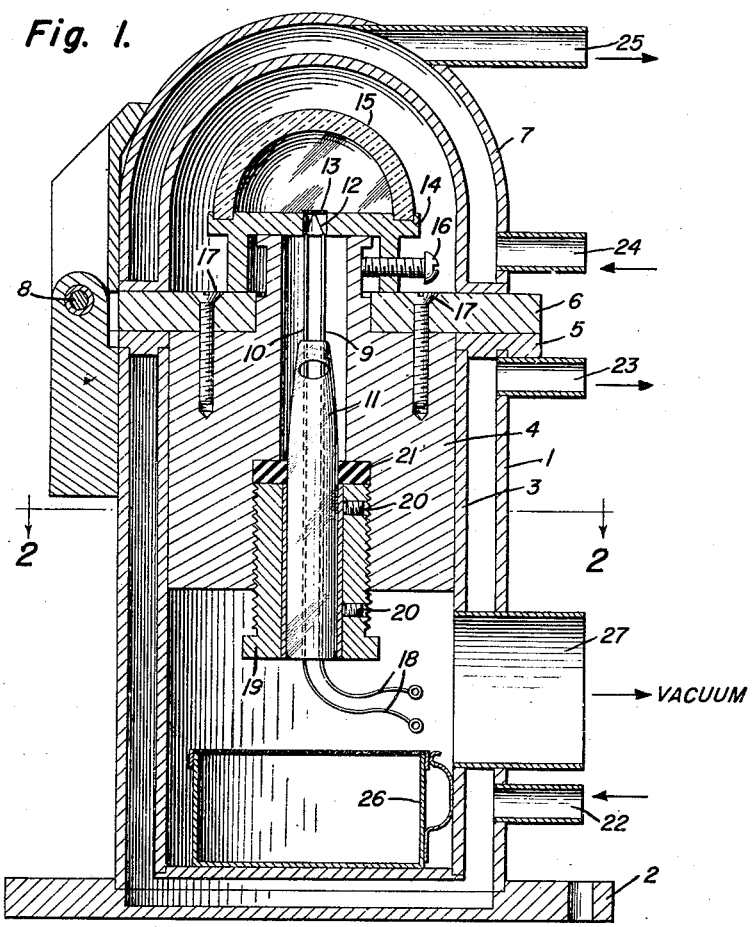
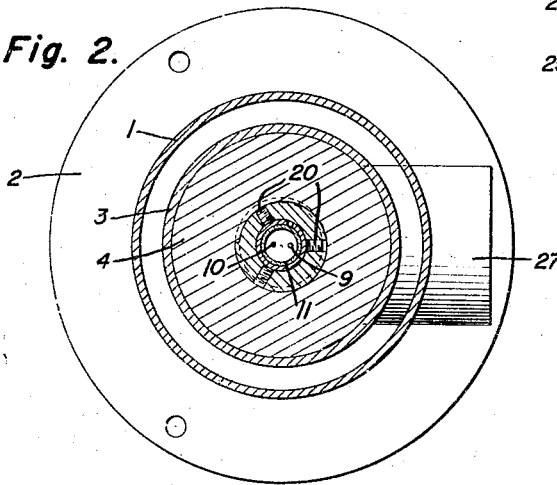
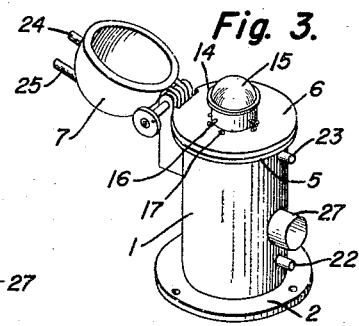
Fig. 1.
Fig. 2.
Fig. 3.
INVENTORS
Sidney C. Stern
Leo C. Clarke
BY George Renehan
ATTORNEY

LONG WAVE RADIOMETER

Sidney C. Stern and Leo C. Clarke, United States Navy

Application June 30, 1953, Serial No. 365,296

1 Claim. (Cl. 73—170)

(Filed under Rule 47(a) and 35 U. S. C. 116)

(Granted under Title 35, U. S. Code (1952), sec. 266)

The invention described herein may be manufactured and used by or for the Government for governmental purposes, without the payment to us of any royalty thereon.

This invention relates to an instrument for measuring long wave radiation. A further object of the invention is to provide an instrument for measuring radiation wherein the sensing element is protected from the atmosphere by means of a transparent cover. A still further object of the invention is to provide an instrument for measuring radiation which includes means for keeping it at a constant temperature and for evacuating air therefrom.

Fig. 1 is an elevation in section of the complete radiometer.

Fig. 2 is a top view of the radiometer taken through section 2-2.

Fig. 3 shows the radiometer with the hinged cover open for sensing radiation.

The instrument consists of a cylindrical body 1 mounted on a circular base 2. A second cylindrical body 3 is supported within the outer cylindrical body 1 thereby providing an annular space for supplying a constant temperature medium between the two cylinders. A cylindrical block 4 is positioned in the upper part of the inner cylinder 3. Annular ring 5 closes the upper end of the instrument as well as the annular space between the cylinders. It also serves as a support for ring 6, which positions and supports cylindrical block 4 by means of screws 17. A spherical cover 7 is hinged at 8 and serves to cover the thermocouple when the instrument is not in use. This cover 7 is likewise provided with an annular space whereby a constant temperature medium can be circulated therethrough. The thermocouple leads 9 and 10 are supported in the glass sleeve 11. The leads 9 and 10 terminate in the thermocouple element 12 which supports the infared absorption element 13. The latter is a thin, gold blacked nickel disc about one-eighth of an inch in diameter and is welded to the thermocouple element. This constitutes a sensing element which projects through a central hole of the inverted cup 14 which, in turn, is attached to and centered on an upward projection of the central cylindrical block 4 by means of screws 16.

The sensing element is covered by means of the transparent hemisphere 15. The latter element is prepared from a mixed crystal which comprises approximately 44% of thallium bromide and 50% thallium iodide. The crystal is formed by slow sintering from a dry powder whereby a large transparent boule is formed which is red in color. The hemisphere 15 is ground from this material in such a manner that it possesses optical properties which tend to focus perpendicular rays upon the central sensing element.

This mixed crystal is described in Optik, Volume 3, 1948, pages 298 to 304, "Optical Structural Subjects from Binary Mixed Crystals", and is known in the trade as KRS-5. It possesses the property of transmitting long waves from about 1 to 40 microns and is especially effective in transmitting rays up to 25 or 30 microns. This hemispherical window performs two important functions in the instrument. First, it keeps the sensing element out of contact with atmospheric turbulence and air currents which tend to affect the reading. Secondly, it selectively transmits a desired band of light rays.

The central thermocouple element terminates in leads 18, which can be brought out to the necessary indicating instrument. The thermocouple is supported in the plug 19 by means of set screws 20. Plug 19 is threaded into cylindrical block 4 and serves to compress seal 21 about the glass sleeve 11. Openings 22, 23 and 24, 25 serve as inlets and outlets for the constant temperature fluid in the body and the cover of the instrument respectively. Container 26 is placed in the bottom of the instrument for the purpose of containing hygroscopic material which serves to keep the interior of the instrument dry. Opening 27, which passes through both the annular cylinders 1 and 3, serves the multiple purpose of admitting container 26, leads 18, and also serves as a means of evacuating the instrument.

In using the instrument, the upper hemispherical cover 7 is opened 180° which exposes the sensing element to the external source of radiation. At the end of ten seconds, the lid is closed, shielding the sensing element from external radiation and restoring thermal equilibrium to the entire apparatus and thermocouples. The E. M. F. generated due to the temperature difference at the thermocouple junctions is fed to suitable electronic equipment which can amplify and record, without distortion, the small electrical outputs.

On theoretical grounds, assuming perfect emissivity, the black body radiation of an object is a function of the fourth power of the absolute temperature of the object. The radiometer is therefore calibrated by maintaining it at constant temperature and intermittently exposing the sensing element to radiation from another hemisphere which is uniformly radiating at known temperatures.

After calibration, the radiometer can be used to determine the radiative transfer of energy from a body of unknown temperature. For meteorological purposes the radiometer is exposed to radiation from the outer atmosphere and then inverted to expose it to radiation from the earth's surface. By reference to calibration charts, the E. M. F.'s recorded can be interpreted to determine the net radiative transfer of heat between the ground and the outer atmosphere.

We claim:

An instrument for measuring long wave radiation comprising a base, hemispherical means transparent to long wave radiation covering said base, a central opening in said base and a thermocouple positioned in said opening, a supporting body below said base inclosing the leads to said thermocouple, an infrared absorption element attached to said thermocouple, said absorption element comprising a thin gold blacked nickel disc, said disc being welded to the thermocouple element, a hinged cover over said transparent hemisphere, said cover and said supporting body being provided with double walls including entrance and exit tubes whereby a fluid medium may be circulated through the annular space between said double walls.

References Cited in the file of this patent

UNITED STATES PATENTS

| | | |
|---|---|---|
| 1,318,516 | Wallis et al | Oct. 14, 1919 |
| 1,535,789 | Moeller | Sept. 15, 1925 |

(Other references on following page)

UNITED STATES PATENTS

| | | |
|---|---|---|
| 2,083,317 | Dallenbach | June 8, 1937 |
| 2,467,120 | Evans | Apr. 12, 1949 |
| 2,648,779 | Kohl | Aug. 11, 1953 |
| 2,666,089 | Gier et al | Jan. 12, 1954 |

OTHER REFERENCES

Article: "Low Temperature Radiation Pyrometry in Industry," Mouzon & Dyer publ. in Journal of the Optical Society of America, vol. 39, No. 3, March 1949,, pages 203-209.